Sept. 18, 1951 L. J. PURCELL 2,567,966

PHONOGRAPH RECORD CABINET

Filed Sept. 11, 1946 3 Sheets-Sheet 1

INVENTOR.
LEE J. PURCELL,
BY
[signature]
ATTORNEY.

Sept. 18, 1951 L. J. PURCELL 2,567,966

PHONOGRAPH RECORD CABINET

Filed Sept. 11, 1946 3 Sheets-Sheet 2

INVENTOR.
LEE J. PURCELL,
BY
Robt. M. Fulwider
ATTORNEY.

Sept. 18, 1951 L. J. PURCELL 2,567,966

PHONOGRAPH RECORD CABINET

Filed Sept. 11, 1946 3 Sheets-Sheet 3

INVENTOR.
LEE J. PURCELL,
BY [signature]
ATTORNEY.

Patented Sept. 18, 1951 2,567,966

UNITED STATES PATENT OFFICE 2,567,966

PHONOGRAPH RECORD CABINET

Lee J. Purcell, Los Angeles, Calif., assignor to Development Corporation of America, Los Angeles, Calif., a corporation of California Application September 11, 1946, Serial No. 696,230

15 Claims. (Cl. 312—17)

The present invention relates to phonograph record cabinets in general and more particularly to an improved record filing cabinet in which the phonograph disk moves automatically to storage position and in which, upon being released, it moves automatically to delivery position in which it is readily grasped by the user. The invention also comprises a phonograph record cabinet in which upon the opening of the doors, a normally hidden indicium moves into position to indicate the location of the various records.

The modern phonograph with its supplementing albums of records is today common in a large percentage of American homes. By careful selection of recordings, one can readily obtain immediate access to the works of the masters or to the current products of the era. Full enjoyment of the mechanical reproducer requires a large number of records, presenting a problem in handling which has bothered every owner. If the records are merely stacked, they collect dust and the relative frictional movement is injurious. If they are stored in albums, it is frequently necessary to handle an entire group of records in order to select the one desired. A common sense solution comprises a unit in which records are stored and arranged in a pre-determined order so that they may be readily identified and removed. In the past such units, however, have not been completely satisfactory. The problem of removing the records and of identifying them often more than offset the advantage gained from a planned arrangement.

The present invention is characterized by the easy reception and delivery of the records, and additionally incorporates indicating means which are normally concealed but which move into functionally operative position when the cabinet is opened. The record need only be placed upon an outer support and released whereupon it moves automatically to its enclosed storage position within the cabinet. The operator need only press a simple lever whereupon the desired record moves automatically from its storage position to an intermediate or delivery position in which it protrudes from the line of records and from the cabinet to enable the selector readily to grasp it with the fingers.

With the foregoing in mind it is an object of the present invention to provide a new and improved phonograph record cabinet in which records move automatically to a storage position upon being placed in an outer receiving position in the cabinet.

It is another object of the invention to provide a phonograph record cabinet in which a record moves automatically from its storage position to an intermediate or delivery position upon the operator performing a simple selection operation.

A still further object of the invention is to provide a storage cabinet for phonograph records in which the insertion and release of the record in the cabinet causes it to move to its storage position in which it is automatically retained, the travel of the record to delivery position being accomplished by the actuation of a simple release lever.

These and other more specific objects will appear upon reading the following specification and claims, and upon considering in connection therewith the attached drawings to which they relate.

Referring now to the drawings in which a preferred embodiment of the invention is illustrated:

Figures 1, 2:
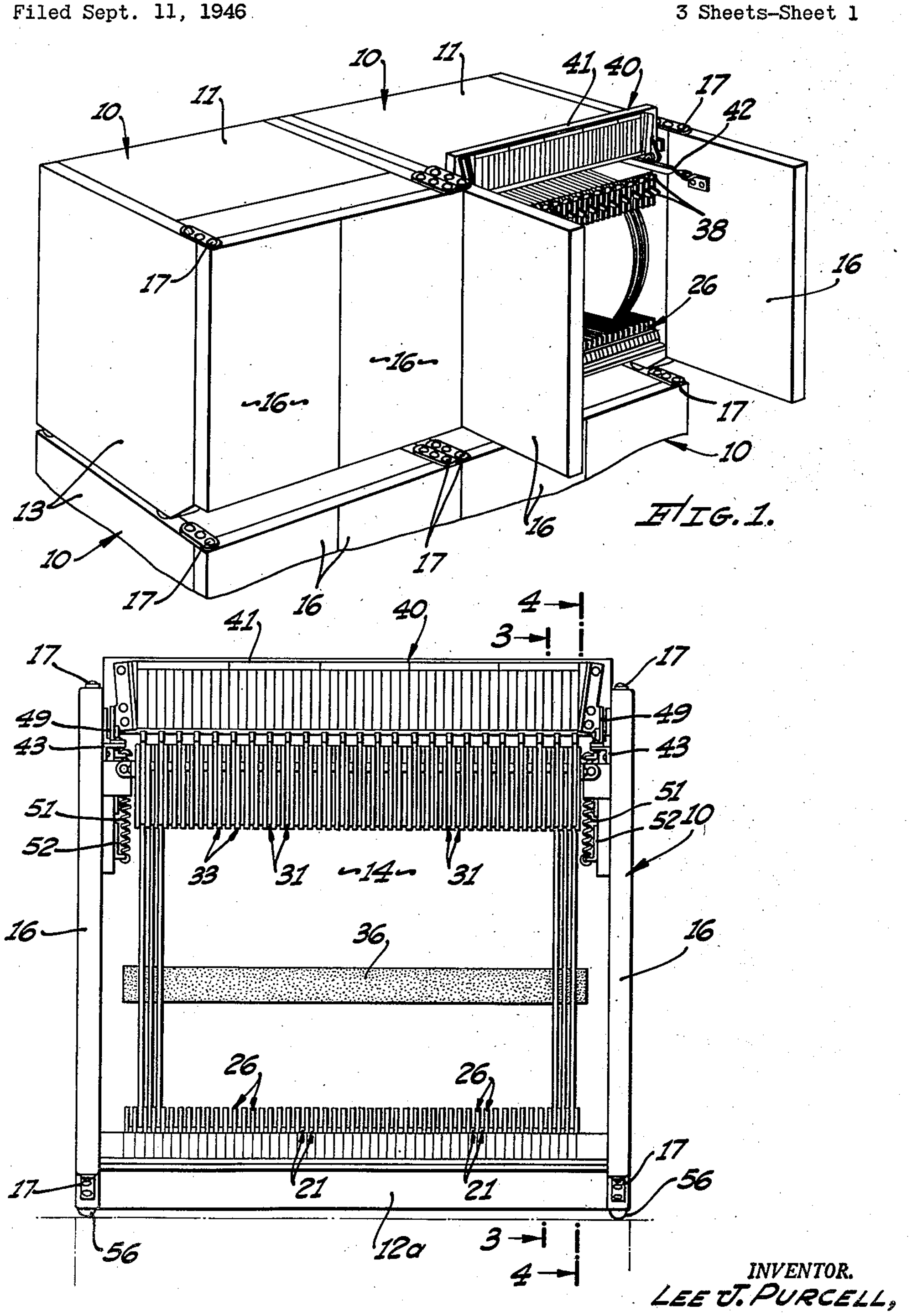
Figure 1 is a view in perspective of a set of cabinets constructed in accordance with the present invention.
Figure 2 is a front view of a cabinet with the doors in the open position.

A cabinet constructed in accordance with the present invention is indicated generally by the reference character 10, and in Figure 1 a plurality of cabinets are shown stacked. Each cabinet case includes top and bottom walls 11 and 12, respectively, joined upon three sides by the side walls 13 and a back wall 14. The bottom wall 12 at its front end slopes upwardly at 12*a* for reasons which will become apparent. The front of the cabinet is closed by doors 16 pivoted upon brackets 17 at their upper and lower edges.

Along the bottom of the cabinet 12, carried and positioned by three spaced rods 19, are a multiplicity of inwardly extending contoured track elements 21 of a width slightly greater than a phonograph record and each comprising an outer receiving surface 22, an inner storage surface 23 and an intermediate curved delivery surface 24. The outer surface 22 receives the record as it is initialy inserted into the cabinet. Surface 24 curves gently upwardly from a central low point toward each of the supporting surfaces 22 and 23, and it is to be noted that surfaces 22 and 23 both slope downwardly toward intermediate surface 24, outer surface 22 being the higher. The tracks 21 are interspaced by spacers or guides 26, the pair of guides upon the opposite side of each track element functioning as retaining means to prevent record displacement. The records are adapted to roll between the spacers 26 which, in a preferred embodiment, are made of molded plastic or other suitable material of light weight and relatively great strength. The tracks 21 may be made of a similar material.

Immediately above the aligned series of tracks 21 are positioned guides or spacers 31 separated by blocks 32, of a width substantially equal to that of the track elements 21. This spacer assembly is positioned and supported by rods 34 which extend between the side walls 13, being similar to the rods 19 which carry the tracks 21.

Figures 3, 4:
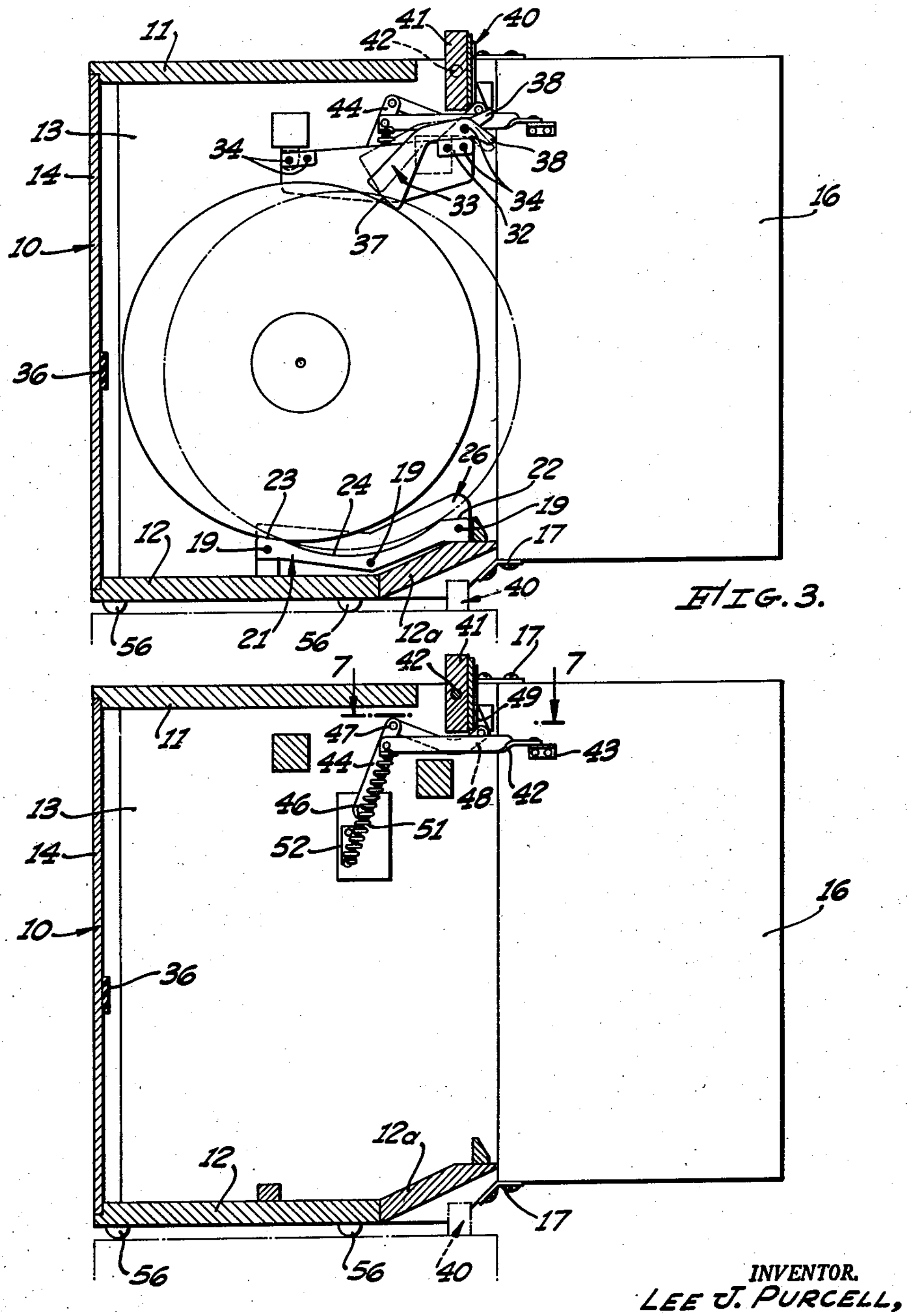
Figure 3 is a longitudinal section upon the line 3—3 of Figure 2 showing the record latching means.
Figure 4 is a second longitudinal section taken upon the line 4—4 of Figure 2 and discloses the door actuated indicium positioning mechanism.
Figure 5:
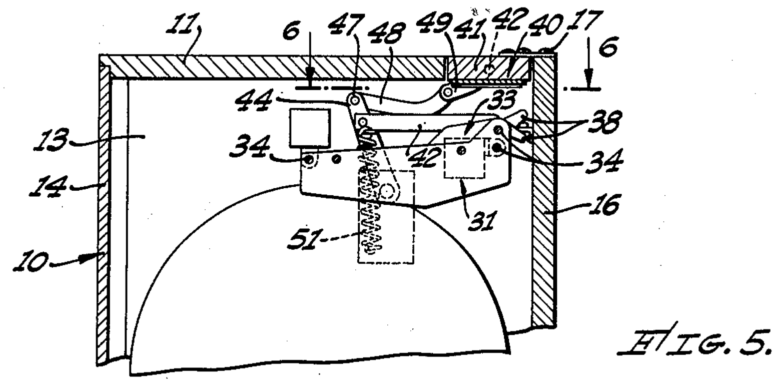
Figure 5 is a partial section similar to Figure 4 but with the cabinet door closed and the indicium moved to its storage position.
Figure 6:
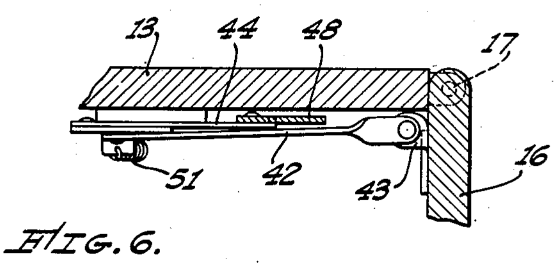
Figure 6 is a horizontal section looking in the direction of the arrows along the line 6—6 of Figure 5.
Figures 7, 8:
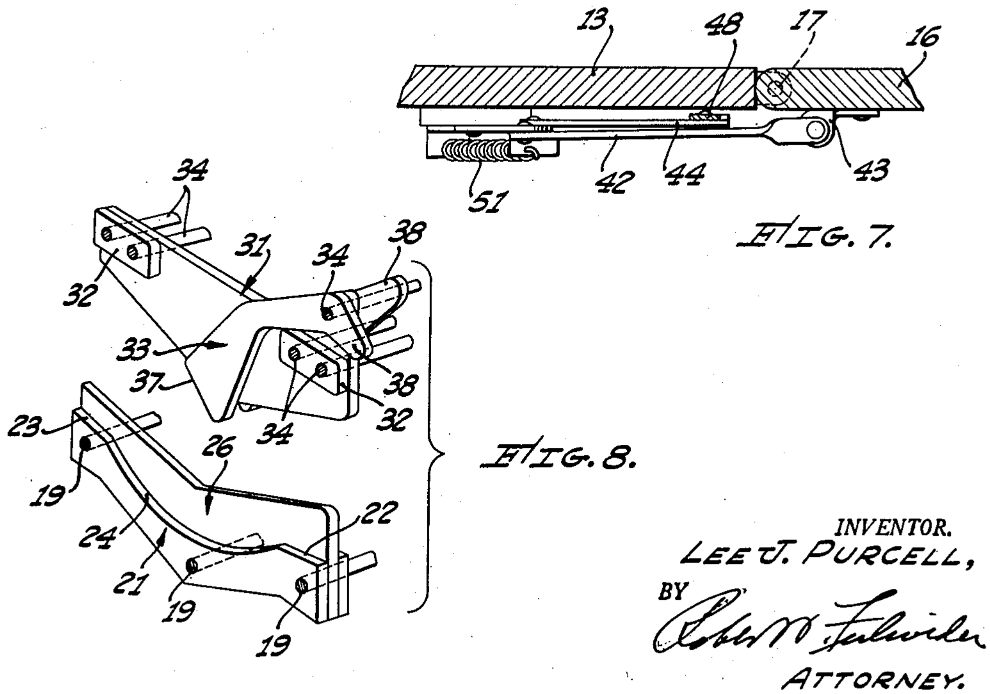
Figure 7 is a view similar to Figure 6 but with the cabinet door moved to an open position.
Figure 8 is a view in perspective of the cooperating record positioning means at the top and at the bottom of the cabinet.

To retain records within the cabinet and in the storage position shown in full lines in Figure 3, latches 33 are pivotally mounted upon the uppermost rod 34 between each pair of spacers or guides 31. Each latch 33 includes a rearward cam face 37 and a forwardly extending lever arm 38. As is clearly shown in Figures 3 and 5, these lever arms upon successive latches 33 slope alternately upwardly and downwardly in order to provide greater spacing and so more accurate selection by the user.

The insertion of a record into the cabinet upon a track 21 and between vertically aligned pairs of spacer elements 26 and 31 places that record initially upon the outer receiving surface or support 22. Surface 22 slopes downwardly and inwardly and under the action of gravity the record rolls into the intermediate curved portion 24, down the forward side thereof, up the inner side, and onto the rear support 23. Its inward travel is halted by its contact with the resilient bumper element 36 extended transversely across rear wall 14.

In entering the cabinet the forward portion of the record contacts the outer inclined edge of latch 33 to pivot that element upwardly to the dotted line position illustrated in Figure 3. The latch normally rests upon the adjacent block 32 and after the record has passed, it drops back into that position. Supporting surface 23 is also sloped downwardly toward intermediate surface 24 and after contacting bumper 36, the record reverses its direction of travel and rolls forwardly. This forward movement is interrupted, however, by its contact with the cam surface 37 of the latch 33, in the manner shown in Figure 3. This contact tends to force the latch past its support 32 but as this is impossible, the result is to fix the record in place. The latches 33 are all of the same size and shape, excepting for the angularity of their levers 38, and are all mounted in the same manner so that the records in the cabinet in storage position are maintained in alignment.

Immediately above the pivoted latches 33 is a name plate or indicium indicated generally by the reference character 40. Indicium 40 includes a rigid base 41 pivoted on a central longitudinal axis 42, and in its normal position with the cabinet closed as in Figure 5, forms a part of the top wall 11. Base 41 is connected by a lever linkage to one of the doors 16 so that upon the movement of the door from closed to open position the indicium will move from its normal position, illustrated in Figure 5, to its indicating position, illustrated in Figure 3. The linkage includes a lever 42 pivotally connected at one end to a bracket 43 on door 16. The opposite end of lever 42 is connected centrally to a second lever 44 which in turn is pivoted at its lower end at 46 to the side wall 13 and at its upper end at 47 to a third lever arm 48. The latter is pivotally connected to a bracket 49 on the forward side of the indicator plate 41. A coil spring 51 connects at its upper end to the lever 42 and at its lower end to bracket 52 on the side wall 13, and is so related to the pivot 46 of lever 44 as to move over center with respect thereto as the door moves between opened and closed positions and so exerts a force to retain the door in both of those positions.

The operation and use of the cabinet constructed in accordance with the present invention is believed to be clear from the foregoing. Rubber supporting knobs or buttons 56 may be provided so that one unit may be positioned directly upon a lower unit in the manner illustrated in Figures 1, 2 and 3 without scratching or marring. The upwardly sloping portion 12*a* of the cabinet bottom wall provides a clearance for the indicium or indicator 40 of the lower cabinet when stacked and when the doors are moved to open position.

If it is desired to obtain a record, the user opens the doors 16 and immediately the indicium or indicator 40 is moved into open position. The indicator contains the name of the record positioned immediately thereunder so that the user, to select the desired record, merely pushes that lever 38 which is positioned below the name of the desired record. This downward movement of the lever 38 causes the latch 33 to move upwardly from the full line to the dotted line position of Figure 3 whereupon the record, being released, rolls forwardly from the storage support 23 into the curved delivery portion 24 of the track 21. In this position, seen clearly in dotted lines in Figure 3, the record projects forwardly of the remaining records stored in the cabinet and in fact forwardly of the forward edge of the side walls 13. This relationship makes it very easy for the user to grasp the record with his fingers to remove it.

To reinsert the record in the cabinet, it is only necessary to place it upon the inwardly sloping receiving support 22 and to release it, or preferably give a slight inward push. The record enters the intermediate portion 24, rolls thereacross pivoting the retaining latch out of its way as previously described. As it contacts the bumper 36, it reverses its direction of travel and is secured in place in its storage position on portion 23 by the camming action of the latch 33.

It will be noted from an examination of Figure 3 that imaginary lines drawn from the point at which the latch member 37 contacts the periphery of the record, to the pivot 34 of the latch and to the center of the record form a very obtuse angle approaching 180°. This particular arrangement of the parts provides for a very pronounced camming action of the latch 33 and requires very little torque from the outward movement of the record to pivot the latch downwardly whereby to cause the latch to jam against the record and hold the same in the cabinet. By reason of this low torque requirement, the latch 33 may have very free pivotal movement on the pivot 34 so as to be readily moved out of the way by the inwardly moving record, yet easily moved to effect the aforesaid jamming action.

While the particular apparatus herein shown and described in detail is fully capable of attaining the objects and providing the advantages hereinbefore stated, it is to be understood that it is merely illustrative of the presently preferred form of my invention, and that I do not mean to limit myself to the details of construction or design herein shown, other than as defined in the appended claims.

I claim:

1. A filing cabinet comprising a casing, a track for a phonograph record extending inwardly from the front of said casing, said track being adapted to support the lower edge of a record and including an outer receiving portion, an intermediate delivery portion lower than said receiving portion, an inner storage portion higher than said delivery portion, and releasable means to hold a record on said storage portion, characterized in that said outer receiving portion is sufficiently above said delivery portion that a record rolling therefrom onto said delivery portion passes onto said storage portion under its own momentum.

2. A filing cabinet comprising a casing, a track for a phonograph record extended inwardly from the front of said casing, said track being adapted to support the lower edge of a record and including an outer receiving portion, an intermediate delivery portion, an inner storage portion, and releasable means to hold a record on said storage portion, characterized in that said outer receiving portion and said inner storage portion are each at higher elevation than said delivery portion, said outer receiving portion being at a higher elevation than said inner storage portion so that records released on said outer receiving portion roll by gravity and momentum across said delivery portion and onto said inner storage portion.

3. A filing cabinet for phonograph records comprising an open front case, pivoted doors closing said front, parallel contoured record tracks extending inwardly from said door along the bottom of said case, each of said tracks including a receiving portion, an intermediate concave portion lower than said receiving portion, and an inner storage portion higher than said intermediate portion but lower than said receiving portion, a buffer to stop records rolling into said case on said tracks, and manually releasable latch means to retain each record on said inner storage portion, said latch means including members each positioned and adapted to be actuated by a record moving on one of said tracks and adapted to permit free inward movement of said record.

4. A filing structure for phonograph records comprising: a supporting track for the edge of a record; and a latch supported above said track, said latch having a pivot, a record contacting member rearwardly and substantially below said pivot, said member being free to swing in either direction about said pivot whereby a record moving rearwardly along said track swings said member in one direction to permit substantially unresisted movement of said record into said structure, and whereby outward movement of said record swings said member in the opposite direction and causes the same to jam against said record to positively prevent withdrawal thereof without independent operation of said latch member.

5. In a record storage structure of the type in which phonograph records are stored in a vertical position with the lower edge supported on a track and are withdrawn forwardly from a storage position by rolling along said track, a latch mechanism for holding a record in said storage position comprising: a pivot having a transverse horizontal axis forward of the center and above the upper edge of a record in said storage position; and a member mounted for free rotation in either direction on said pivot, said member having a portion extending rearwardly and downwardly to contact a point in the periphery of said record, said portion being of size and disposition such that lines drawn from said contact point to said pivot and to said record center form an angle closely aproaching 180° whereby said latch portion is adapted to be freely swung rearwardly by a record moving inwardly on said track to permit free inward movement of said record and swung outwardly by an outwardly moving record to cam against the same and positively prevent withdrawal thereof.

6. A record storage structure of the type in which phonograph records are stored in a vertical position with the lower edge supported on a track and are withdrawn forwardly from a storage position by rolling along said track, a latch mechanism for holding a record in said storage position comprising: a pivot having a transverse horizontal axis forward of the center and above the upper edge of a record in said storage position; and a member mounted for free rotation in either direction on said pivot, said member having a portion extending rearwardly and downwardly to contact a point in the periphery of said record, said portion being of size and disposition such that said contact point is only slightly to the rear of a line between said pivot and record center whereby said latch portion is adapted to be freely swung rearwardly by a record moving inwardly on said track to permit free inward movement of said record and swung outwardly by an outwardly moving record to cam against the same and positively prevent withdrawal thereof.

7. A filing structure for phonograph records comprising: a bottom member and at least one pair of spaced, parallel guides extending inwardly from the front of said bottom member and forming therewith a slot to support a record standing on edge therein, said slot having an outer receiving portion, an intermediate delivery portion, and an inner storage portion, characterized in that said outer receiving portion and said inner storage portion are each at higher elevation than said delivery portion, said receiving portion being at a higher elevation than said inner storage portion so that records released on said outer receiving portion will roll by gravity and momentum across said delivery portion and onto said inner storage portion; and releasable means to hold a record on said storage portion.

8. A filing structure for phonograph records comprising: a bottom member and at least one pair of spaced, parallel guides extending inwardly from the front of said bottom member and forming therewith a slot to support a record standing on edge therein, said slot having an outer receiving portion, an intermediate delivery portion, and an inner storage portion, characterized in that said outer receiving portion and said inner storage portion are each at higher elevation than said delivery portion, said receiving portion being at a higher elevation than said inner storage portion so that records released on said outer receiving portion will roll by gravity and momentum across said delivery portion and onto said inner storage portion; and manually releasable latch means to retain a record on said inner storage portion, said latch means including a member positioned and adapted to be actuated by a record rolling in said slot and adapted to permit inward movement of said record.

9. A filing structure for phonograph records comprising: a bottom member and at least one pair of spaced, parallel guides extending inwardly from the front of said bottom member and forming therewith a slot to support a record standing on edge therein, said slot having an outer receiving portion, an intermediate delivery portion, and an inner storage portion, characterized in that said outer receiving portion and said inner storage portion are each at higher elevation than said delivery portion, said receiving portion being at a higher elevation than said inner storage portion so that records released on said outer receiving portion will roll by gravity and momentum across said delivery portion and onto said inner storage portion; and a latch supported above said slot, said latch having a pivot, a record-contacting member rearwardly and substantially below said pivot, said member being free to swing in either direction about said pivot whereby a record moving rearwardly along said slot swings said member in one direction to permit substantially unresisted movement of said record inwardly through said slot, and whereby outward movement of said record swings said member in the opposite direction and causes the same to jam against said record to positively prevent withdrawal thereof without independent operation of said latch member.

10. A filing structure for phonograph records comprising: a bottom member and at least one pair of spaced, parallel guides extending inwardly from the front of said bottom member and forming therewith a slot to support a record standing on edge therein, said slot having an outer receiving portion, an intermediate delivery portion, and an inner storage portion, characterized in that said outer receiving portion and said inner storage portion are each at higher elevation than said delivery portion, said receiving portion being at a higher elevation than said inner storage portion so that records released on said outer receiving portion will roll by gravity and momentum across said delivery portion and onto said inner storage portion; and a latch mechanism for holding a record on said storage portion comprising a pivot having a transverse, horizontal axis forward of the center and above the upper edge of a record on said storage portion, and a member mounted for free rotation in either direction on said pivot, said member having a portion extending rearwardly and downwardly to contact a point in the periphery of said record, said portion being of size and disposition such that lines drawn from the contact point to said pivot and to said record center form an angle closely approaching 180 degrees whereby said latch portion is adapted to be freely swung rearwardly by a record moving inwardly through said slot to permit free inward movement of said record, and swung outwardly by an outwardly moving record to cam against the same and positively prevent withdrawal thereof.

11. A phonograph record storage structure comprising: a substantially horizontal bottom member; a track for a phonograph record extending inwardly from the front of said bottom member, said track being adapted to support the lower edge of a record and including an outer receiving portion, an intermediate delivery portion lower than said receiving portion, and an inner storage portion higher than said delivery portion, characterized in that said outer receiving portion is sufficiently above said delivery portion that a record rolling therefrom onto said delivery portion passes onto said storage portion under its own momentum; a pair of spaced, parallel guides aligned with said track and spaced above the same to support a record in a vertical position rolling on said track; and releasable means supported between said guides to hold a record on said storage portion.

12. A phonograph record storage structure comprising: a substantially horizontal bottom member; a track for a phonograph record extending inwardly from the front of said bottom member, said track being adapted to support the lower edge of a record and including an outer receiving portion, an intermediate delivery portion lower than said receiving portion, and an inner storage portion higher than said delivery portion, characterized in that said outer receiving portion is sufficiently above said delivery portion that a record rolling therefrom onto said delivery portion passes onto said storage portion under its own momentum; a pair of spaced, parallel guides aligned with said track and spaced above the same to support a record in said vertical position rolling on said track; and a latch supported above said track, said latch having a pivot, a record-contacting member rearwardly and substantially below said pivot, said member being free to swing in either direction about said pivot whereby a record moving rearwardly along said track swings said member in one direction to permit substantially unresisted movement of said record inwardly along said track, and whereby outward movement of said record swings said member in the opposite direction and causes the same to jam against said record to positively prevent withdrawal thereof without independent operation of said latch member.

13. A filing structure for phonograph records comprising: a supporting track for the edge of a record, said track having an outer receiving portion higher than the remainder thereof whereby a record placed on said receiving portion rolls by gravity and momentum inwardly along said track; and a latch supported above said track, said latch having a pivot, a record-contacting member rearwardly and substantially below said pivot, said member being free to swing in either direction about said pivot whereby a record moving rearwardly along said track swings said member in one direction to permit substantially unresisted movement of said record into said structure, and whereby outward movement of said record swings said member in the opposite direction and causes the same to jam against said record and positively prevent withdrawal thereof without independent operation of said latch member.

14. A filing structure for phonograph records comprising: a supporting track for the edge of a record, said track having an inner storage portion and an outer receiving portion higher than the remainder thereof whereby a record placed on said receiving portion rolls by gravity and momentum inwardly along said track; and a latch mechanism for holding a record on said storage portion comprising a pivot having a transverse, horizontal axis forward of the center and above the upper edge of a record on said storage portion, and a member mounted for free rotation in either direction on said pivot, said member having a portion extending rearwardly and downwardly to contact a point in the periphery of said record, said portion being of size and disposition such that lines drawn from the contact point to said pivot and to said record center form an angle closely approaching 180 degrees whereby said latch portion is adapted to be freely swung rearwardly by a record moving inwardly on said track to permit free inward movement of said record, and swung outwardly by an outwardly moving record to cam against the same and positively prevent withdrawal thereof.

15. A filing structure for phonograph records comprising: a supporting track for the edge of a record, said track having an outer receiving portion higher than the remainder thereof whereby a record placed on said receiving portion rolls by gravity and momentum inwardly along said track; a pair of spaced, parallel guides aligned with said track and spaced above the same to support a record in said vertical position rolling on said track; and a latch supported above said track, said latch having a pivot, a record-contacting member rearwardly and substantially below said pivot, said member being free to swing in either direction about said pivot whereby a record moving rearwardly along said track swings said member in one direction to permit substantially unresisted movement of said record inwardly along said track, and whereby outward movement of said record swings said member in the opposite direction and causes the same to jam against said record to positively prevent withdrawal thereof without independent operation of said latch member.

LEE J. PURCELL.

REFERENCES CITED

The following references are of record in the file of this patent:

UNITED STATES PATENTS

| Number | Name | Date |
|---|---|---|
| 1,026,111 | Nichols | May 14, 1912 |
| 2,300,781 | Gilley | Nov. 3, 1942 |
| 2,363,574 | Cowan | Nov. 28, 1944 |
| 2,402,044 | Heckman | June 11, 1946 |
| 2,402,076 | Painter | June 11, 1946 |
| 2,402,746 | Goldich | June 25, 1946 |